United States Patent [19]

Szantho et al.

[11] Patent Number: 4,904,838
[45] Date of Patent: Feb. 27, 1990

[54] ELECTRODE CHANGERS AND METHODS OF OPERATION FOR ELECTRICAL BONDING APPARATUS

[75] Inventors: Charles F. Szantho, Roselle Park; Allan Warner, Clark; Edward D. Riordan, S. Somerville, all of N.J.

[73] Assignee: Joyal Products, Inc., Linden, N.J.

[21] Appl. No.: 164,122

[22] Filed: Mar. 4, 1988

Related U.S. Application Data

[63] Continuation-in-part of Ser. No. 908,566, Sep. 18, 1986, Pat. No. 4,766,282.

[51] Int. Cl.⁴ ............................................. B23K 11/30
[52] U.S. Cl. ............................... 219/86.8; 219/86.33; 219/86.7
[58] Field of Search ................ 219/86.25, 86.33, 86.7, 219/86.8

[56] References Cited

U.S. PATENT DOCUMENTS

3,313,909  4/1967  Matthews ........................... 219/86.8

Primary Examiner—Clifford G. Shaw
Attorney, Agent, or Firm—Lerner, David, Littenberg, Krumholz & Mentlik

[57] ABSTRACT

Electrical bonding apparatus such as a fusing machine is provided with plural separate electrode holders such that the position of an electrode relative to each holder can be adjusted. The position of each electrode relative to the holder is adjusted while the holder is detached from the machine, and while other holders and electrodes are in place on the machine. Thus, the machine can be provided with a new electrode preadjusted to the desired position by interchanging electrode holders. An electrode changer on the fusing machine may include a frame and a movable retaining element adapted to hold several electrodes at different stations. Electrical transmission elements such as brushes on the retaining element and frame may be biased against one another to provide an electrically conductive path, and this bias may be released upon movement of the retaining element relative to the frame so as to avoid wear of the electrical transmission elements. The holders may be releasably attached to the retaining element and may be detached and replaced to interchange the holders on the machine with other holders.

32 Claims, 4 Drawing Sheets

ELECTRODE CHANGERS AND METHODS OF OPERATION FOR ELECTRICAL BONDING APPARATUS

CROSS REFERENCE TO RELATED APPLICATION

This is a Continuation in Part of U.S. patent application Ser. No. 908,566, filed Sept. 18, 1986 now U.S. Pat. No. 4,766,282.

BACKGROUND OF THE INVENTION

The present invention relates to apparatus and machines for bonding elements of a workpiece to one another by application of electrical current.

In the process commonly referred to as "fusing", electrodes are applied to the elements of an electrically conductive workpiece, and electrical current is directed through the electrodes so as to form a bond between the workpiece elements. One electrode referred to as to the "fusing" electrode engages an element of the workpiece adjacent the juncture between elements, and substantial forces are applied through this electrode so as to force the workpiece elements together. The opposite electrode, normally referred to as the "ground electrode" engages one or another of the workpiece elements remote from the juncture. The fusing electrode typically has a relatively high resistivity. An electrical potential is applied across the electrodes causing current to flow through the electrodes and the workpiece. Substantial heat is generated in the resistive fusing electrode so that heat is transferred from the fusing electrode to the engaged workpiece element. The workpiece elements fuse with one another under the combined influences of heat transferred from the fusing electrode and pressure applied by the fusing electrode. By contrast, in the bonding process referred to as spot welding, the major portion of the heat evolved during the process is generated by the electrical resistance within the workpiece itself. Both processes, however, involve application of electrical current by means of electrodes engaged with the workpiece.

Fusing has been widely employed in industry for joining metallic workpiece elementssuch as elements of electrical apparatus. For example, in the manufacture of dynamoelectric machines such as motors and generators, the wires constituting the windings of a rotor may be bonded to the commutator by fusing.

Fusing machines of the type disclosed in U.S. Pat. Nos. 4,510,370 and 4,371,772 can employ a rodlike metallic fusing electrode having a pointed contact region or tip. This rodlike electrode is retained in a bore in a conductive, metallic electrode holder block. The electrode holder block is bolted to a movable ram on the fusing machine. A linkage actuated by a fluid power cylinder is arranged to advance the ram and hence the holder block and electrode towards a workpiece so as to engage the tip of the fusing electrode with the workpiece at a predetermined force for a predetermined time. During this time, electrical current is passed through the electrode holder block to the fusing electrode and the workpiece. A separate ground electrode holder provides for engagement of a ground electrode with the workpiece.

Substantial forces and electrical currents must be transmitted through the fusing electrode in this arrangement. Also, the location of the tip of the fusing electrode with respect to the fusing machine head has a significant influence on the results achieved. To provide for location of the fusing electrode, and to prevent unwanted movement of the fusing electrode with respect to the head, the holder block has features which engage features of the fusing machine ram so as to precisely locate the holder block with respect to the ram. Also, the holder block is provided with an electrode adjusting screw coaxial with the electrode receiving bore. The adjusting screw extends into this bore, and the end of the rodlike fusing electrode remote from the tip bears on this screw. Thus, the position of the electrode relative to the holder block can be adjusted by means of the adjustment screw. Typically, a setscrew is also provided so as to lock the electrode in position after adjustment.

As the tip of the fusing electrode is engaged with successive workpieces and used in repeated fusing operations, the tip gradually wears and erodes. This alters the configuration of the contact region at the tip of the electrode and also changes the location of the contact region or tip relative to the fusing machine ram. Wear and erosion of the fusing electrode contact region, if left uncorrected, can impair the fusing process. Wear and erosion of the ground electrode contact region, although generally less severe, can have similar effects. Accordingly, it has been the practice heretofore to change the electrodes as needed to provide new contact regions. Typically, the fusing electrode has been changed by removing the holder block from the fusing machine head, removing the used electrode and substituting a new electrode. As the new electrode may have dimensions different from the previously used electrode, it has been necessary to readjust the adjustment screw in the fusing electrode holder block to bring the contact region at the tip of the electrode into the desired location with respect to the holder block. Ordinarily, the entire fusing machine is out of service during the time required for these steps. The loss of productive time and interruption in production flow associated with these steps can be significant, especially where the fusing machine forms part of a larger automated production line. Thus, the entire line may be brought to a halt during the time required for electrode changing and adjustment.

One solution to these problems is set forth in copending, commonly assigned U.S. patent application No. 908,566, filed Sept. 18, 1986, the disclosure of which is hereby incorporated by reference herein. In apparatus according to one embodiment disclosed in said '566 application, a turret is used instead of the electrode holder block. The turret has a shaft and a plurality of bores extending radially with respect to the shaft. The shaft and turret are rotatably mounted on a fixed element or frame which in turn is attached to the head of the fusing machine. Each bore is provided with an adjustment screw similar to the adjustment screw used in the ordinary holder block. Before the machine is started, a plurality of rodlike fusing electrodes are engaged in the turret, and adjusted by means of the adjusting screws so that the contact regions or tips of all of these electrodes lie at the same radial distance from the axis of the shaft. During normal operation of the fusing machine, the shaft and turret are locked against rotation so as to hold one fusing electrode and hence one fusing contact region in an operative or workpiece engaging disposition. That particular fusing electrode is engaged with workpieces processed by the machine. Mechanical means are provided for unlocking the turret, rotating the turret through a predetermined angle so as to swing a new fusing electrode into operative disposition and then relocking the turret. These operations can be accomplished quickly, without appreciable loss of productive time or interruption in production flow. To provide electrical power to the turret and hence to the fusing electrode, one or more brushes are movably mounted on the frame and spring-biased into engagement with the shaft so as to maintain electrical contact despite rotation of the shaft. These brushes are similar in principle to the spring-loaded brushes employed with the commutator of an electric motor or the like. The machine disclosed in the '566 application also has means for renewing the ground contact region, as by moving an elongated, bladelike ground electrode so as to present a new region of the ground electrode in operative or workpiece engaging disposition. U.S. Pat. No. 3,313,909 discloses a spot welding machine which likewise employs a turret to hold a plurality of electrodes and means for intermittently turning the turret so as to present a new electrode in operative disposition. The '509 patent likewise employs biased brushes engaging the shaft to carry the necessary electrical current to the turret and electrodes.

Although electrode changers as disclosed in the '566 application provide very substantial improvements, there has been need for still further improvements. Thus, the electrode changer disclosed in the '566 application can provide continuous, substantially uninterrupted productivity only until all of the electrodes mounted on the turret are used and worn to the maximum permissible extent. At that time, the machine must be stopped. All of the electrodes mounted on the turret must be changed, and the position of each new electrode relative to the turret must be adjusted. The fusing machine must be idle during these steps.

Also, the brushes and shaft tend to wear and deteriorate with use. These components must carry substantial electrical currents during the fusing operation. The contact resistance at the mating surfaces of the brush and shaft must be low. To provide this low resistance, the brush and shaft are biased against one another with substantial force. Also, at least the mating surfaces of the brush and shaft must be formed from relatively soft, highly conductive materials, such as copper, silver or alloys of these metals. These factors tend to accelerate wear on the mating surfaces of the brush and shaft.

Thus, there have been substantial unmet needs for still further improvements.

SUMMARY OF THE INVENTION

The present invention addresses these needs.

One aspect of the present invention provides an electrode changer for an electrical bonding machine such as a fusing machine. An electrode changer according to this aspect of the present invention includes a frame and a retaining element movably mounted to the frame. Means are provided for securing at least one electrode defining a plurality of contact regions to the retaining element. Thus, the securement means may be arranged to accommodate a single electrode which by itself defines a plurality of contact regions or, more typically, to accommodate a plurality of electrodes each of which defines one contact region. Retaining element movement means are provided for arresting movement of the retaining element relative to the frame so that one contact region is in a workpiece engaging or operative position during normal operation of the fusing machine, and intermittently releasing the retaining element and moving it relative to the frame so as to bring a new one of the contact regions into operative position. Electrical transmission elements are provided on the retaining element and frame, either as integral parts of these components or as separate elements mounted thereto. Thus, the electrical transmission elements will move relative to one another when the retaining element moves relative to the frame. Biasing means are provided for biasing these electrical transmission elements against one another so as to maintain them in electrical contact with one another and hence to provide an electrically conductive pass between the frame and the retaining elements. Bias relief means are provided for temporarily releiving the bias applied to the electrical transmission elements concomitantly with the intermittent movement of the retaining element relative to the frame. Thus, the bias relief means may be arranged to reduce the bias before each intermittent movement and restore the bias to the normal level after each intermittent movement, so that the biasing force is reduced throughout each intermittent movement. The reduction in the biasing force may be sufficient to substantially eliminate the biasing force, concomitantly with each intermittent movement.

Reduction in the biasing force during each intermittent movement substantially eliminates wear on the mating surfaces of the electrical transmission elements. Further, frictional resistance to movement of the retaining element is substantially reduced. Thus, the load on the mechanical components utilized to move the retaining element is reduced, leading to reduction in the size and cost of the components required to effect such movement.

This aspect of the present invention incorporates the realization that electrical currents will not be applied to the electrodes during the electrode change cycle, but rather will only be applied during normal operation of the fusing machine, while the retaining element is locked in position. Accordingly, there is no need for substantial bias forces on the electrical transmission elements during movement of the retaining elements. The present invention further provides methods of operating electrical bonding equipment such as fusing machines which methods incorporate the step of temporarily relieving the bias applied to electrical transmission elements during movement of a mobile electrode retaining element.

A further aspect of the invention provides an electrode changer for a bonding machine such as a fusing machine. The changer incorporates a plurality of separate electrode holders. Each holder preferably has means for engaging an electrode and means for adjusting the position of the electrode relative to the holder. A retainer element and means for mounting the retainer element on the machine are also provided. Electrode holder securement means are provided for releasably securing at least one of the electrode holders to the fusing machine so that one such electrode holder is in an operative or workpiece engaging position. The holder securement means may be arranged so as to hold the electrode holder which is in operative position at a predetermined location relative to the retainer element and hence at a predetermined location relative to the machine. Holder change means are provided for substituting a new one of said electrode holders for a previously used electrode holder in operative disposition.

The retaining element may have a plurality of stations for engaging a plurality of electrode holders, and the holder change means may include means for moving the retaining element so as to bring a new one of the electrode holders engaged with the retaining element into operative disposition. In this arrangement, the fusing machine need not be idle during the time required for adjustment of electrode positions. Thus, because the electrode holder provides means for adjusting the position of the electrode, each electrode can be adjusted to position its contact region at a predetermined location relative to the holder while the holder is detached from the retaining element and while at least one other electrode holder is engaged with the retaining element and in operative disposition. The time required to detach a previously used electrode holder from the retaining element and replace it with a new retaining element is minimal, inasmuch as no adjustments need be made during this process. Where the retaining element is adapted to engage a plurality of electrode holders, a previously used electrode holder which is at a nonoperative position can be detached from the retaining element and replaced by a new electrode holder while another electrode holder remains at the operative position. This can be accomplished during continued operation of the fusing machine. Alternately, operation of the fusing machine can be interrupted briefly while one electrode holder or all of the electrode holders on the retaining element are detached and a new holder or holders is attached in place. The holder change means may include mechanically actuated means such as an industrial robot for detaching a used electrode holder from the retaining element and engaging a new electrode holder in its place.

Preferably, each electrode holder includes an abutment surface and the retaining element also includes an abutment surface at each station. The electrode holder is desirably adapted to receive each electrode holder so that each abutment surface on the holder is engaged with the abutment surface on the retaining element, and hence these abutment surfaces control the location of the holder relative to the retaining element. Forces may be transmitted through the engaged abutment surfaces of the retaining element and electrode holder so as to urge the contact region of the electrode against the workpiece during use. These substantial forces will hold the abutment surfaces in tight engagement and hence will maintain both accurate positioning of the holder relative to the fetaining element and good electrical contact between the electrode holder and retaining element. The retaining element may have a bore and an abutment surface adjacent the bore, whereas the electrode holder may have an elongated shank adapted to fit within the bore and an abutment surface adjacent the shank.

The present invention also provides methods of operating electrical bonding equipment. In these methods, a plurality of electrode holders, each having an electrode positioned theron are positioned in sequence at an operative disposition on the machine and used in bonding operations. The positioning operation, most preferably includes the steps of detaching each holder from the machine after use and replacing the detached electrode holder with another electrode holder. Thus, an electrode may be positioned and adjusted in one electrode holder while that holder is detached from the machine and while the machine continues to operate with another holder and electrode in place, and the newly adjusted holder may be substituted for a used holder on the machine. The adjustment procedure may be performed using a fixture to provide precise location of the contact region of the electrode relative to the holder. Thus, the electrode holders can be continually recycled, providing an endless stream of holders bearing preadjusted electrodes. Even for a production run of infinite duration, the machine need not be stopped for electrode adjustment.

These and other objects, features and advantages of the present invention will be more readily apparent from the detailed description of the preferred embodiments set forth below, taken in conjunction with the accompanying drawings.

DETAILED DESCRIPTION OF THE PREFERRED EMBODIMENTS

An electrode changer in accordance with one embodiment of the present invention includes a frame member or block 10 having features such as recess 12 and a threaded hole 14 on a top surface 16 of the block adapted to engage features of a fusing machine as described below. Block 10 also has a shaft bore 18 extending entirely through the block along an axis 20 adjacent to the bottom surface 22 of the block. Block 10 also has a pair of brush passages 24 and 26 (FIG. 4) extending in opposite directions from bore 18, these brush passages 24 and 26 being disposed at diametrically opposed locations with respect to axis 20. Block 10 also has an arrest cylinder bore 28 extending generally parallel to and above shaft bore 18. Arrest cylinder bore 28 is open at the front surface 30 of the block but does not extend through to the back surface 32. Block 10 also has a bias pressure bore 34 extending entirely through the block transverse to bores 18 and 28, from the left side 36 of the block to the right side 38. Bias pressure bore 34 is disposed above arrest cylinder bore 28. The bias pressure bore has two regions 40 and 42 of relatively large diameter at each end. Region 40 is open to the left side 36 of the block whereas region 42 is open to the right side 38 of the block. Block 10 also defines passageways 44 and 46, schematically indicated in the drawings, for connecting bias pressure bore 34 and arrest cylinder bore 28, respectively, with external fluid pressure sources.

A mobile electrode retaining element 50 includes an electrically conductive plate 52 and a shaft 54 connected to the plate by bolts 56. Plate 52 has six stations, each including a bore 58 extending radially with respect to the axis of shaft 54. Each bore 58 has an opening 60 at a forward or outboard end remote from the axis of the shaft. Plate 52 also defines a flat, outboard abutment surface 62 at each station immediately surrounding the open end 60 of the bore 58. Each abutment surface 62 faces in the forward or outboard radial direction along the axis of the bore 58 away from the axis of shaft 54.

All of the outboard abutment surfaces 62 are disposed at the same distance from the axis of shaft 54. Each bore 58 has a relatively large diameter portion 64 adjacent the open end 60 of the bore and a relatively small diameter portion 66 at the inboard end of the bore, closest to the center of the plate and hence closest to the axis of shaft 54. Thus, plate 52 defines a step or inboard abutment surface 68 encircling each bore 58 at the juncture of the large and small diameter portions 64 and 66 of the bore. Each such inboard abutment surface 68 also faces in the forward or outboard direction, away from shaft 54, and all six of the inboard abutment surfaces 68 are disposed at the same distance from the axis of shaft 54.

Figure 1:
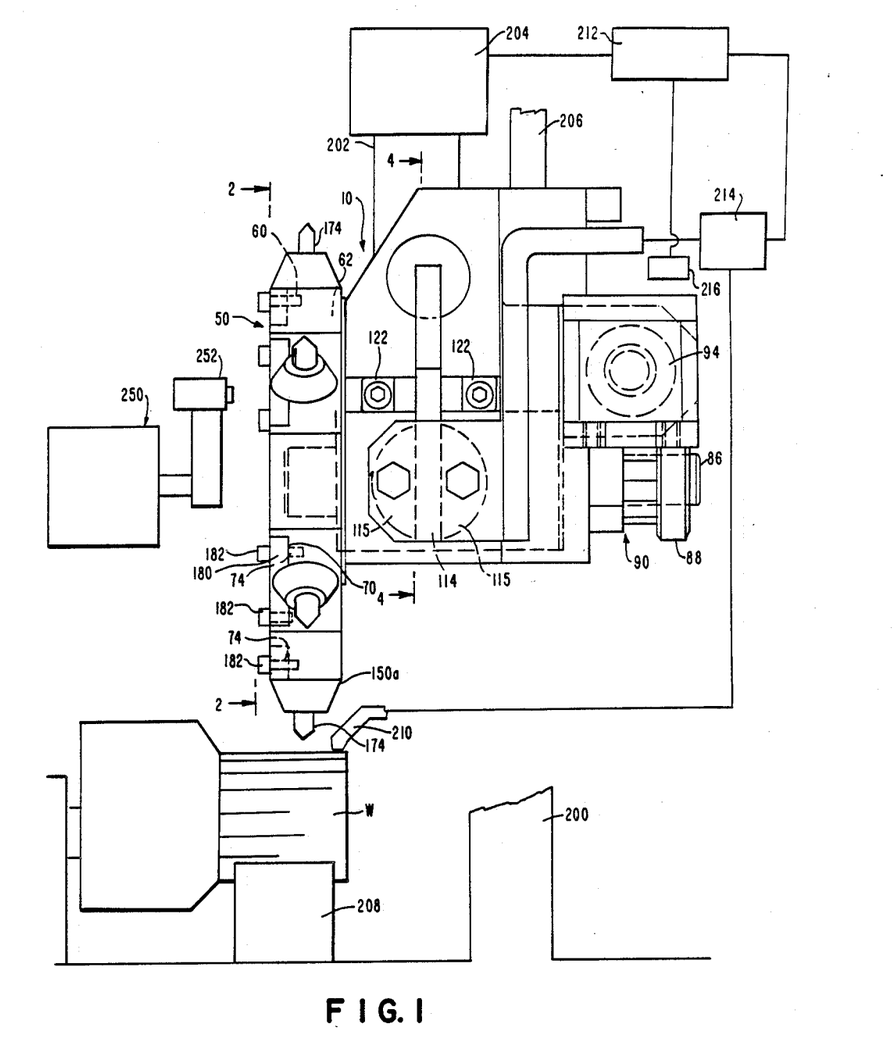
FIG. 1 is a schematic elevational view of an electrode changer and fusing machine in accordance with one embodiment of the present invention.

Plate 52 also has six notches 70 extending from a face 72 of the plate into the large diameter portion 64 of each bore 58 immediately adjacent the outboard or forward open end 60 of the bore. Two bolt holes 74 (FIG. 1) are provided adjacent each such notch. Six arrest pin receiving holes 76 are provided in the face 75 of the plate opposite face 72. Holes 76 extend parallel to shaft 54, and are aligned with bores 58 so that the axis of each hole 76 crosses the axis of a corresponding bore 58. Each hole 76 is provided with a hard, wear-resistant bushing 78.

Shaft 54 has a relatively small diameter portion 80 engaged within plate 52, a relatively large diameter portion 82 extending from surface 75 of plate 52, a relatively small diameter portion 84 projecting from the end of large diameter portion 82 remote from the plate, and a tip portion 86 having screw threads and a keyway at the end of the shaft remote from plate 52.

Figure 2:
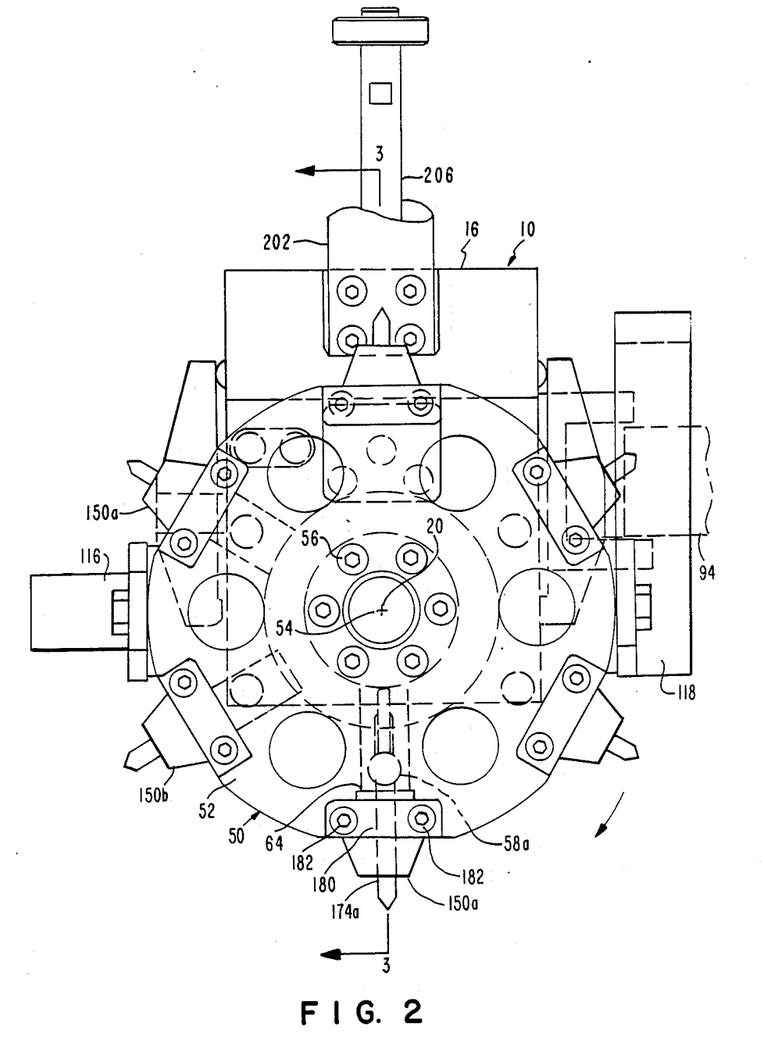
FIG. 2 is a fragmentary elevational view taken along lines 2—2 in FIG. 1.
Figure 3:
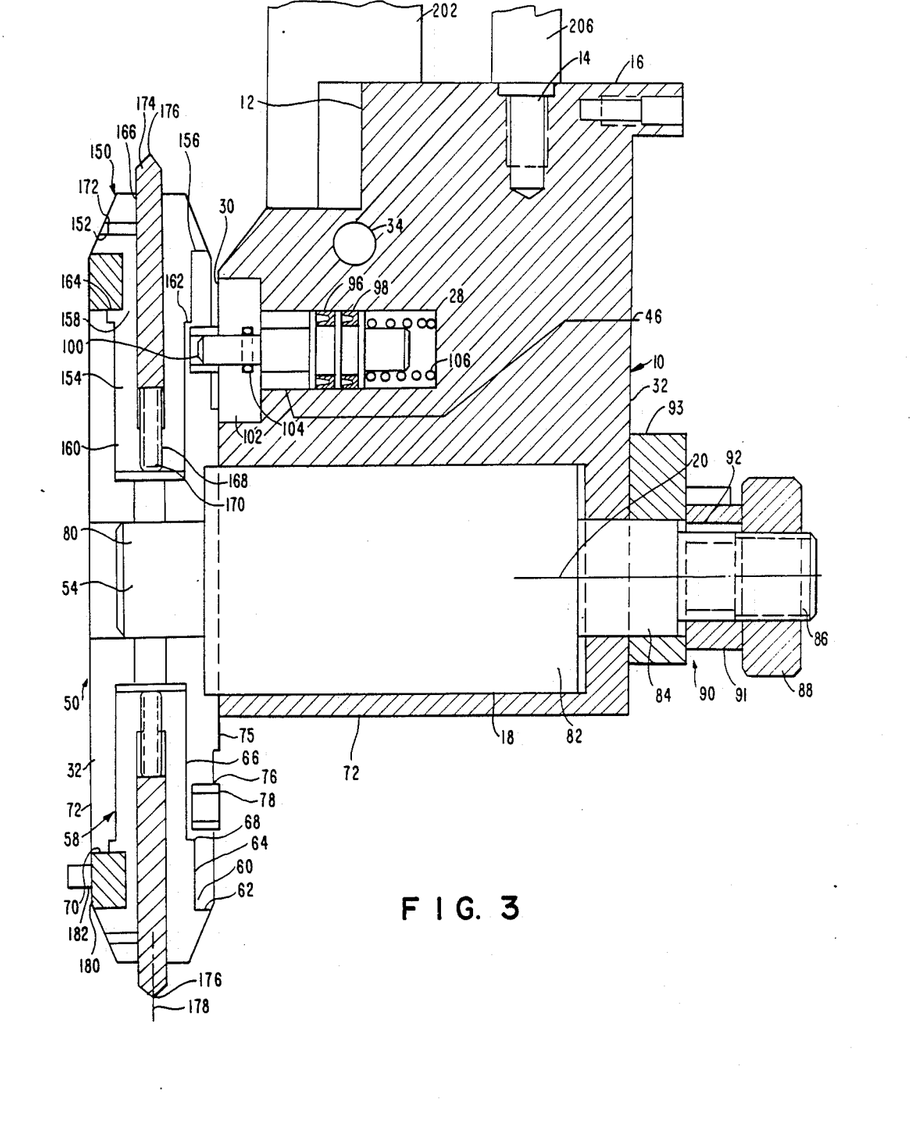
FIG. 3 is a fragmentary sectional view taken along lines 3—3 in FIG. 2.

Shaft 54 is received in shaft bore 18 of block 10, so that the axis of the shaft is coaxial with the axis 20 of the bore. Thus, the entire retaining element 50 including both plate 52 and shaft 54 is rotatable as a unit with respect to the frame or block 10 about axis 20. A nut 88 is threadedly engaged with the threads 86 on the shaft to retain the shaft and hence the retaining element 50 on block or frame 10. A unidirectional clutch mechanism 90 including two movable elements 91 and 93 is disposed between nut 88 and the back face 32 of the frame or block 10. One component 91 of unidirectional clutch 90 is drivingly engaged with shaft 54 via a key 92, whereas the other component 93 of the clutch is linked to the piston of a linear fluid-power actuator or air cylinder 94 (FIGS. 1 and 2) via an appropriate linkage (not shown) such as an arm, clevis or rack. The housing of actuator 94 is mounted to the back side of frame 10. The stroke of actuator 94 is selected so that movement of the actuator over its range of motion corresponds to 60° rotation of the retaining element 50 about axis 20. As clutch 90 couples the retaining elements 50 to the actuator piston upon movement of the actuator piston in one direction, but decouples the retaining element 50 from the actuator piston upon the reverse movement, each full forward and reverse movement cycle of the actuator will result in 60° rotation of retaining element 50 about axis 20 in a predetermined advancing direction, which is the clockwise direction as seen in FIG. 2.

A piston 96 having appropriate resilient seals 98 is disposed within arrest cylinder bore 28. Piston 96 has a pin 100 extending from the end of the piston adjacent the front side 30 of frame or block 10. A bushing 102 is disposed in the open end of arrest cylinder bore 28, and a further resilient seal 104 is mounted in the bushing in sealing but slidable engagement with pin 100. A compression spring 106 is disposed between piston 96 and the closed or back end of arrest cylinder bore 28. Spring 106 biases piston 96 and hence pin 10 towards the extended position shown, wherein pin 100 projects beyond the front face 30 of frame 10. In this position, pin 100 is engaged in one of the bushings 78 in one of the arrest pin receiving holes 76 of retaining element 50, and hence pin 100 locks the entire retaining element 50 against rotation relative to frame 10. However, application of a high pressure fluid such as air to the interior of cylinder bore 28 via passageway 46 will move piston 96 and hence pin 100 to a retracted position wherein the pin is clear of the bushing 78 and hence the retaining element 50 is free to rotate.

Two brushes 108 and 110 are slidably received in brush passageways 26 and 24 of frame 10, so that each brush is free to move towards and away from axis 20. Each brush has an inboard end 112 facing towards axis 20, the inboard end of each such brush confronting the exterior cylindrical surface of large diameter portion 82 of shaft 54. The inboard end of each brush has a concave surface with a radius substantially equal to the radius of shaft portion 82. Each brush also has a pair of fingers 115 at the outboard end of the brush, these fingers cooperatively defining a generally vertically oriented slot 114. A terminal bracket 116 is mounted to the fingers 115 of one brush 108, whereas a terminal bracket 118 of somewhat different configuration is mounted to the fingers 115 of the opposite brush 110. Each brush preferably is formed from an electrically conductive metal such as copper or a copper alloy and may have a layer of silver on its exterior surface. Each brush also has a hard steel bearing block 120 threadedly engaged with the brush and protruding slightly into the slot 114 of the brush between the fingers 115.

Figure 4:
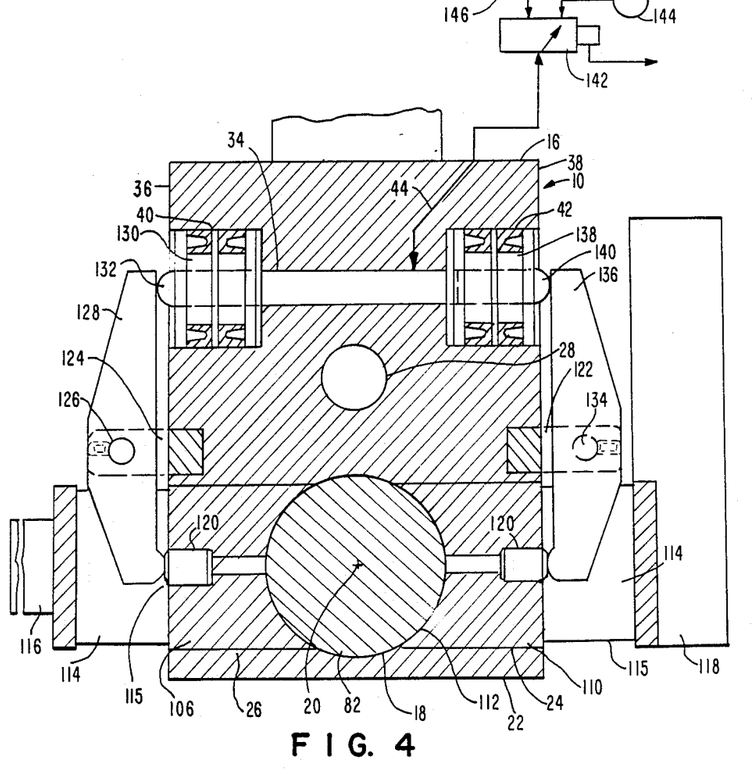
FIG. 4 is a fragmentary sectional view taken along line 4-4 in FIG. 1.

A pair of support pillars 122 are fixedly mounted to the right side 38 of frame 10 above brush passageway 24, whereas a similar pair of pillars 124, of which only one is visible in FIG. 4, is mounted to the left side 36 of frame 10 above brush passageway 26. A shaft 126 extends through pillars 124 substantially parallel to axis 20, and an arm 12B is pivotably mounted to pillars 124 by shaft 126. The lower end of arm 128 is engaged with the bearing block 120 of brush 108. A piston 130 having appropriate resilient seals is engaged in the large diameter section 40 of bias pressure bore 34 at the left side of frame 10, and a short piston rod 132 connected to piston 130 is engaged with the upper end of arm 128. A substantially identical but mirror-image arrangement of components including a shaft 134 supported on pillars 122, an arm 136 pivotably mounted via shaft 134 and a piston 138 having a rod 140 in contact with the upper end of arm 136 is provided at the right side 38 of frame 10.

That portion of brush bias bore 34 between pistons 130 and 138 is linked via passageway 44 to a control valve 142. Valve is adapted to normally connect the passageway 44, and hence bore 34, to a source of high pressure air 144 but to connect the passageway and bore to an atmospheric vent 146 upon receipt of a control input. When brush bias bore 36 is connected to the source 144 of high pressure air, there is substantial air pressure within the brush bias bore, and pistons 130 and 138 are urged outwardly towards the side of the frame by the air pressure. Thus, the pistons urge the upper ends of arms 128 and 136 outwardly, so as to bias the lower ends of the arms inwardly, towards axis 20. Thus, brushes 108 and 110 will be biased inwardly into engagement with the surface of shaft portion 82. Accordingly, the inboard surfaces 112 of the brushes will be in intimate electrical contact with the surface of shaft portion 82. However, when bias bore 34 is connected to atmospheric vent 146, the pressure within the bias bore will be released, and hence the biasing forces on the brushes will be reduced essentially to zero.

A plurality of identical electrode holders 150 are also provided. The number of electrode holders provided is greater than the number of stations or bores 58 on retaining element 50. Each electrode holder has a body including an elongated, generally frustoconical head 152 at one end, and an elongated shank 154 projecting from the head 152 in a first axial direction. The shank has a first cylindrical portion 158 adjacent the head 152. Shank portion 158 is of lesser diameter than the immediately adjacent region of head 152, so that the head defines an abutment surface 156 facing in the first axial direction at the juncture with the shank. Each shank also has a relatively small diameter cylindrical portion 160 remote from the head, so that the shank defines a step or further abutment surface 162 extending entirely around the shank at the juncture of the large and small diameter portions 158 and 160 and facing in the first axial direction. A slot extends transverse to the axis of the shank at the large diameter portion 158 of each shank, so that the shank defines a lip 164 facing in the second axial direction towards head 152.

Each electrode holder 150 has a central bore 166 coaxial with its shank, each such bore having a threaded portion 168 at the end of the shank remote from the head 152 and an unthreaded portion extending through the head. An adjusting screw 170 is threadedly engaged in the threaded portion 168 of each central bore. Each electrode holder is provided with a small set screw 172 threadedly engaged in a set screw bore extending through the head 152 of the electrode holder transverse to the central bore 166. Thus, each electrode holder can engage and retain an elongated rodlike electrode 174 having a contact region 176 at its tip so that the electrode protrudes from the holder in the second axial direction. That is, adjustment screw 170 bearing on the end of each electrode 174 remote from its tip 176 will determine the location of the electrode along the axis 178 of bore 166 and shank 154, and hence will determine the distances along the axis from the contact region or tip 176 to abutment surface 156 and to abutment surface 16 of the electrode holder. By adjustment of screw 170, these axial distances can be varied or adjusted as desired. Set screws 172 holds the electrode in position against accidental displacement away from adjusting screw 170.

The shank 154 of each electrode holder is dimensioned to fit closely within any bore 58 of electrode retaining element 50. When an electrode holder is so disposed in the bores, the small diameter portion 160 of the shank fits closely within the small diameter rearward portion 66 of the bore 58, whereas the large diameter portion 158 of the shank fits closely within the large diameter forward portion 64 of each bore. The abutment surface 156 of the electrode holder confronts the forward or outboard facing abutment surface 62 of the electrode retaining element, whereas the abutment surface 162 of the electrode holder confronts the inboard abutment surface 68 of the electrode retaining element. The axis 178 of the shank is coaxial with the axis of the associated bore 58, and hence the axes of the electrode holders engaged with the retaining element and the axis of the electrodes extend generally radially with respect to shaft 54 and All of the abutment surfaces 62 on the retaining element are disposed at the same radial distance from axis 20 and all of the abutment surfaces 68 are also disposed at the same radial distance. Therefore, the contact regions or tips 176 of all of the electrodes on retaining element 50 will lie at the same radial distance from axis 20 provided that each such contact region lies at the same predetermined position with respect to the associated electrode holder 150, i.e., provided that the distance along axis 168 from each contact region to the abutment surface 156 of the associated electrode holder is the same.

Each electrode holder is releasably retained in an associated bore 58 by a catch 180. Each catch 180 is received in the notch of an electrode holder 150, and each catch extends into the associated bore 58 so as to engage the forwardly facing lip 164 on the electrode holder. Each catch 180 is retained in position by bolts 182 extending through the catch into bolt holes 74 in plate 52 of the electrode retaining element. Bolts 182 apply forces to each catch 180 transverse to the axis 178 of the associated bore and electrode holder. The bolts thus bias each catch 18 and the associated electrode holder transversely of the bore axis 178. Thus, bolts 182 and catches 180 force each engaged electrode holder into tight engagement with the circumferential walls of the associated bore 58.

Figure 5:
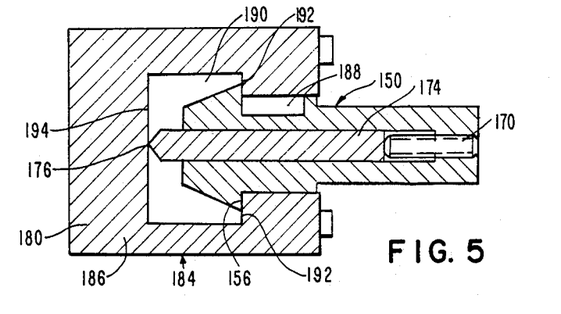
FIG. 5 is a schematic view depicting a setting fixture utilized with components of the machine of FIGS. 1-4.

A fixture 184 is provided to facilitate positioning of each electrode with respect to the associated electrode holder. Fixture 184 includes a metallic channel 86 generally C-shaped in cross section. Channel 186 defines a slot 188 at the mouth of opening of the C-shaped cross section and a somewhat wider space 190 within the interior of the C. The channel has a face 194 facing towards the slot 188 and oppositely directed lip faces 192 adjacent to tee slot but facing towards the face 194. Channel 186 is constructed and dimensioned so that the distance between lip faces 192 and face 194 is equal to the desired axial distance from the abutment surface 156 of each electrode holder to the tip or contact region 176 of the electrode. Thus, each electrode can be adjusted to the same predetermined location with respect to the associated electrode holder by placing the electrode holder and electrode into the fixture as illustrated in FIG. 5 and adjusting the adjusting screw 170 of the electrode holder until the tip or contact region 176 of the electrode contacts surface 194 and abutment surface 156 of the electrode holder contacts the surfaces 192. After this adjustment, the set screw 172 of the electrode holder may be tightened.

The electrode changer is used in conjunction with a fusing machine. The fusing machine may be generally in accordance with the disclosure of U.S. Pat. Nos. 4,371,772 and 4,510,370. A fusing machine as disclosed in these patents may include a frame 200, a ram or head 202 for moving the fusing electrode relative to the frame during each fusing operation, and a power operated mechanism, 204, for moving the ram. Actuating mechanism 204 may include devices such as adjustable springs and the like as disclosed in the '370 patent for controlling the force applied through ram 202, and may also incorporate sensing switches and the like as further disclosed in the '370 patent for providing a signal indicating that a predetermined load has been applied to ram 202. The fusing machine may further include a stop rod 206 for limiting downward travel of the fusing electrode. Rod 206 may engage appropriate stops (not shown) on the frame 200 of the machine. The fusing machine may also incorporate a workpiece holder such as a V-block 208 for holding a workpiece W such as a dynamoelectric machine rotor. The block or frame 10 of the electrode changer is secured to the ram 202 and the stop rod 206 of the fusing machine by fittings 12 and 14 so that the frame is disposed generally above workpiece holder 208 and hence generally above any workpiece disposed in the workpiece holder. Thus, the frame 10 and retaining element 50 will move upwardly and downwardly with ram 202. The particular electrode holder 150 and electrode 174 which point directly downwardly from axis 20 at any given time will be in an operative disposition for engagment with the workpiece upon downward movement of the ram 202, frame 10 and retaining element 50. The remaining electrodes and electrode holders will be in non-operative dispositions. As illustrated, electrode holder 150a and electrode 174a engaged therewith are in an operative position, whereas the remaining electrode holders and electrodes are in non-operative dispositions. The fusing machine also includes means for holding a ground electrode 210 and contacting the ground electrode with workpieces engaged in workpiece holding element or V-block 208. Ground electrode 210 may be an elongated, bladelike structure, and the fusing machine structures used to hold and move the ground electrode may include means for periodically shifting the ground electrode in its direction of elongation so as to present a new region of the ground electrode in alignment with V-block 208 for engagement with workpieces. The fusing machine also includes a control system 212 and a fusing potential source 214 controlled by control system 212. Potential source 214 has one terminal linked to the terminal brackets 116 and 118 of the electrode changer, and another terminal linked to the ground electrode 210. Control means 212 is also arranged to control a source 216 of fluid such as air under pressure linked to linear actuator 94 and linked via passageway 46 to arrest cylinder bore 28. Control means 212 is also connected to the control input of valve 142 (FIG. 4).

In operation, the electrode changer typically is loaded with a full complement of six electrode holders 150, each having an electrode 174 preadjusted to the same predetermined position with respect to the electrode holder. Additional electrode holders 150, also with electrodes preadjusted to a desired, predetermined position relative to the electrode holder are held in reserve. Control means 212 normally does not activate air pressure source 216, so that no air pressure is applied either to arrest cylinder bore 28 or to fluid actuator 94. Thus, the electrode retaining element 50 remains locked in one position relative to frame 10, so that the same electrode holder and electrode remain in operative disposition, pointing downwardly. During this time, valve 142 maintains communication between high pressure air source 144 and brush bias bore 34. Accordingly, the fluid pressure in the bias bore forces pistons 130 and 138, and the upper end of arms 128 and 136 outwardly, thus biasing the lower ends of the arms and the brushes inwardly so as to maintain the brush surfaces 112 in intimate contact with the surface of shaft portion 82 on the electrode retaining element 50. The electrode changer is maintained in this condition while successive workpieces are engaged in workpiece holder 208. The control means 212 repeatedly commands ram actuating device 204 to advance ram 202 downwardly so as to force the fusing electrode 174a in operative disposition against each workpiece. At the same time, the control means commands the ground electrode engaging means to engage ground electrode 210 with the workpiece, and, upon engagement of both electrodes, commands potential source 214 to deliver the required electrical potential. Electric current generated by potential source 214 flows through brackets 118 and 116 to brushes 108 at 110, and from the brushes to the mating large diameter electrical contact portion 82 of shaft 54 on retaining element 50. The electrical current is thus transmitted through shaft 54 to the plate 52 of the retaining element through the plate to the electrode holder 150a in operative disposition and through this electrode holder to the electrode 174a which is in contact with the workpiece, to the workpiece and back to the ground electrode 210. This current heats the fusing electrode and particularly the narrow tip or contact region 176 bearing on the workpiece. Under the combined influences of this heat, heat generated within the workpiece via internal resistance and the pressure applied through the fusing electrode, the elements of the workpiece immediately adjacent the fusing electrode fuse with one another. After an appropriate time, the current flow is discontinued and the ram actuator is operated to lift ram 202 and hence to lift frame 10 and retaining element 50 upwardly, away from the workpiece. The cycle is then repeated either on a new workpiece or at another location on the same workpiece, and this process continues for many successive workpieces.

During each such fusing cycle, the brushes 108 and 110 provide reliable current transmission to the electrical transmission portion 82 of the shaft, as the brushes are strongly biased against the shaft by the fluid pressure applied through bias bore 34. Also, there is reliable transmission of electrical power with minimal resistance between the plate 52 of retaining element 50 and the electrode holder 150a. The forces applied through ram 202 to bring the electrode into engagement with the workpiece will tend to force the electrode and electrode holder rearwardly along the axis of the bore. The abutment surfaces 156 and 162 on the electrode holder thus will be forced into engagement with the mating abutment surfaces 62 and 68 on the retaining element 50 and hence into good electrical contact with the retaining element. Thus, there is good electrical contact over a substantial area. Desirably, the areas of the abutment surfaces which are in contact with one another should have a total area at least equal to the cross sectional area of the rodlike electrode 174 or greater. Further, each electrode holder is in tight engagement with the circumferential wall of the surrounding bore under the influence of force applied through plates 180. This provides still further contact between the electrode holder and retaining element for transmission of electric current.

After many repetitions of the fusing cycle, the tip 176 of the particular fusing electrode 174a in operative position will become worn. The electrode changer is used to bring a new electrode holder and hence a new electrode into operative position. Typically, this is accomplished during an interval between fusing cycles. Such intervals may occur when a workpiece is repositioned in V-block 208 or while a new workpiece is inserted in the V-block. As the first step of the electrode change cycle, control means 212 actuates valve 142 to disconnect bias bore 34 from the high pressure air source and connect the bias bore to the vent 146. Thus, the pressure in the bias bore is released and the forces on pistons 130 and 138 are reduced essentially to zero. The corresponding bias forces on electrodes 108 and 110 are likewise reduced essentially to zero. The control means then actuates air pressure source 216 to provide air pressure to arrest cylinder bore 28, thus retracting pin 100 out of engagement with the retaining element, and the control means further causes the source 216 to provide high pressure air to actuator 94. Actuator 94 drives shaft 54 through 60° rotation in the advancing direction, clockwise as seen in FIG. 2. This swings the previously used bore or station 58a of the electrode retaining element, previously used electrode holder 150a and used electrode 174a to a nonoperative disposition, with the electrode holder occupying the position indicated at 150b, and advances a new bore, electrode holder and electrode into operative disposition. After such rotation, the control means causes a source 216 to release the air pressure from arrest cylinder bore 28, thus causing pin 100 to engage the bushing 78 of retaining element 50 which has become aligned with the pin upon the 60° rotation. The control means causes valve 142 to reconnect bias bore 34 with high pressure source 144, thus restoring the biasing forces on brushes 108 and 110 to the normal level. At this time, the electrode changer and fusing machine are ready for further fusing cycles. Because the bias of electrical transmission elements or brushes 108, 110 against the electrical transmission element or shaft portion 82 of the retaining element 5 is substantially relieved during movement of the retaining elements relative to frame 10, there is no significant wear on the electrical transmission elements 108, 110 and 82 occurs as a result of this movement.

This process continues with continued intermittent movement of the retaining element as needed to advance a new electrode holder and electrode to operative position. During this continuing operation, previously used electrode holders 150 can be detached from retaining element 50 and replaced by reserve electrode holders bearing fresh, unused electrodes. Each such reserve electrode holder has the new electrode preadjusted to the desired position relative to the electrode holder. Because the ram of the fusing machine makes only small upward and downward movements at relatively low linear speeds, a mechanic can manually engage bolts 182 on any station of the retaining element 50 which is at an inoperative position with a wrench. While the fusing machine continues to operate, the mechanic can detach or loosen these bolts, and the associated catch 180, and slide the old electrode holder out of the bore 58 at that station, thus detaching the used holder 150 and electrode 174 from the retaining element and from the fusing machine. The reverse process of attaching a replacement holder 150 can also be conducted during actual operation of the machine. Thus, the mechanic need only insert the new electrode holder into the bore 58 and tighten the catch 180 and bolts 182. In inserting the electrode holder, the mechanic need not make any adjustments or the like, but rather need only slide the electrode holder home against the abutment surfaces 62 and 68 of the retainer element. Even if the mechanic fails to engage the electrode holder against the abutment surfaces of the retaining element, the electrode holder will be so engaged when it reaches operative position and the electrode forcibly engaged with a workpiece. Thus, the forces applied during a fusing cycle will slide the electrode holder into full engagement with the abutment surfaces of the retainer element and hence will accurately position the electrode holder. Preferably, the machine is equipped with appropriate safety guards to allow the mechanic to reach the bolts, catches and electrode holders at one or more inoperative positions while keeping fingers and tools clear of other, hazardous components. The control means may be provided with a switch or interlock to prevent rotational movement of the retaining element during detachment and reattachment of electrode holders. Alternatively, the entire machine may be stopped for the brief period required to detach one or more used electrode holders and replace the same with reserve electrode holders. Such a brief interruption does not substantially disrupt the production flow.

In the course of a continued product run, all of the electrode holders, including the reserve electrode holders, are cycled through the system in sequence. Each electrode holder is attached to the retaining element and fusing machine employed in the operative disposition and then detached. Preferably, the electrode installed in each electrode holder is replaced or reground to the desired tip configuration, and then the replaced or reground electrode is adjusted to the desired position relative to the electrode holder while the electrode holder is detached from the machine using the fixture as discussed with reference to FIG. 5. This process is conducted while other electrode holders are in place on the machine and in use. Thus, the machine can be supplied continually with electrode holders bearing new or reground electrodes. This continual supply can be maintained even for a production run of essentially infinite length. Thus, such production runs can be conducted without any substantial interruption in operation of the fusing machine.

The electrode changing system may further include a conventional industrial robot 250 equipped to perform the attachment and detachment operations discussed above. Thus, the robot provides mechanical means for detaching used electrode holders from the retaining element and attaching new electrode holders. Desirably, the robot is equipped with a conventional arm or working component 252 adapted to hold a variety of tools and to interchange and use these tools according to a predetermined program. One tool held by the robot arm may be a wrench or the like for engaging the bolts 182, whereas another tool may engage the plate 180 and yet another tool may be adapted to grasp an electrode holder. Preferably, the logic system of the robot 250 is linked to the control system 212 of the fusing machine s that the robot does not attempt to change the electrode holder at a particular station while the retaining element is rotated. Alternatively, the robot can be adjusted to follow such rotation. The robot may be programmed to move the operative arm 252 upwardly and downwardly in synchronism with the repetitive upward and downward movements of the fusing machine ram 202.

Numerous variations and combinations of the features described above can be employed. Thus, the arrangement for biasing the electrical transmission elements on the retaining element and frame against one another and releasing such bias upon movement of the retaining element can be employed with retaining elements different from that discussed above. The electrode bias and bias release means can be used with a turret-type electrode retaining element where the individual electrodes are attached to the retaining element without the use of separate electrode holders. The fluid actuated biasing means and means for relieving the bias by relieving the fluid pressure described above can be replaced by other forms of biasing and bias relieving mechanisms. Thus, the electrical transmission elements may be biased against one another by means of springs, cams, weights or other conventional force applying devices, and the bias releasing means may include any conventional mechanism for temporarily disabling the force applying device or for counteracting the forces applied by such device. Where the electrical transmission elements on the retaining element and frame are biased against one another by a compression spring, the bias relieving means may include mechanical means for relieving the compression in the spring or else may include means such as a fluid actuated cylinder and piston for applying a force opposite to that applied by the spring.

The bias relieving means need not completely release or remove the bias but instead may only reduce the bias somewhat to lower than normal value concomitantly with the movement of the retaining element. For example, the bias relieving means may be effective to connect a fluid actuated biasing mechanism to a source of air at relatively low pressure rather than to the atmosphere concomitantly with movement of the retaining element. Such a partial bias relief arrangement can be used to provide a light wiping action of the electrical transmission element surfaces against one another so as to remove oxidation or corrosion products from the surfaces. Such a light wiping action may be conducted at force levels which do not result in appreciable wear of the surfaces. Also, the bias relieving means may be arranged to release the bias on the electrical transmission elements simultaneously with or after the beginning of each movement of the retainer element and to restore the bias simultaneously with or before the end of each such movement.

The retaining elements may be arranged to move linearly rather than to rotate relative to the frame to bring a new retaining element into operative position. The electrical transmission element biasing arrangement would be modified accordingly, but desirably still would provide relief of the bias during movement of the retaining element.

In a further alternate embodiment, the retaining element is fixed relative to the frame and has provisions to accommodate only one electrode holder at a time, in the operative disposition. In this arrangement, and electrode holder is detached from the retaining element and replaced each time a new electrode is required. Although such an arrangement is less preferred, it nonetheless provides substantially uninterrupted production because the time required for replacement of an electrode holder is so short. Thus, because a supply of reserve electrode holders with new electrodes preadjusted to the desired position is continually available, there is no need to stop the fusing machine for the prolonged period required to adjust an electrode. This arrangement can be used where a robot as discussed above or other mechanical device is provided for detaching and reattaching electrode holders.

As these and other variations and combinations of the features described above can be employed, the foregoing description of the preferred embodiments should be taken by way of illustration rather than by way of limitation of the invention as defined in the claims.

We claim:
1. An electrode changer for electrical bonding apparatus comprising:
 (a) a frame;
 (b) a retaining element movably mounted to the frame;
 (c) means for securing at least one electrode defining a plurality of contact regions to said retaining element;
 (d) means for arresting movement of said retaining element relative to said frame so as to hold one of said contact regions in an operative position and intermittently moving said retaining element relative to said frame to bring a new one of said contact regions into said operative position;
 (e) means for transmitting electrical current to said retaining element, said electrical transmitting means including an electrical transmission element on said frame and an electrical transmission element on said retaining element;
 (f) means for biasing said electrical transmission elements into engagement with one another; and
 (g) means for temporarily relieving said bias concomitantly with intermittent movement of said retaining element.

2. An electrode changer as claimed in claim 1 wherein said means for biasing includes means for producing a biasing force responsive to pressure of a fluid and said means for temporarily relieving said bias includes means for reducing said fluid pressure.

3. An electrode changer as claimed in claim 1 wherein said means for temporarily relieving said bias includes means for relieving said bias prior to each said intermittent movement and restoring said bias after each said intermittent movement.

4. An electrode changer as claimed in claim 1 wherein said means for temporarily relieving said bias includes means for substantially completely releasing said bias concomitantly with each said intermittent movement of said retaining element.

5. An electrode changer as claimed in claim 1 wherein said retaining element is mounted to said frame for rotation about a predetermined axis, said means for moving said retaining element relative to said frame including means for rotating said retaining element.

6. An electrode changer as claimed in claim 5 wherein said electrical transmission elements include a brush movably mounted to said frame and said biasing means includes means for biasing said brush relative to said frame.

7. An electrode changer as claimed in claim 5 wherein said electrical transmission elements include a shaft on said retaining element at said predetermined axis and two brushes movably mounted to said frame on opposite sides of said axis, said means for biasing including means for biasing both of said brushes transversely of said axis toward said shaft with substantially equal force.

8. An electrode changer as claimed in claim 7 wherein said means for biasing includes a chamber and means for applying bias to both of said brushes responsive to fluid pressure in said chamber, said means for temporarily reducing said bias including means for relieving the fluid pressure in said chamber.

9. A fusing machine comprising an electrode changer as claimed in claim 1, means for repetitively moving said frame so as to repetitively engage one of said contact regions which is in said operative disposition with successive workpieces and means for applying an electrical current through said electrical transmission elements to said contact region in operative disposition.

10. A method of operating an electrical bonding machine having a frame, a retaining element, at least one electrode defining a plurality of contact regions on said retaining element and electrical transmission elements on said frame and said retaining element comprising the steps of:
(a) maintaining said retaining element in fixed position relative to said frame so as to maintain one of said contact regions in operative disposition;
(b) repetitively engaging the contact region in operative disposition with successive workpieces;
(c) biasing said electrical transmission elements against one another so as to maintain the same in electrical contact with one another and transmitting electrical current through said electrical transmission elements to the contact region in a operative position so as to thereby perform a bonding operation on each workpiece;
(d) intermittently moving said retaining element relative to said fixed element so as to bring a new one of said contact regions into operative disposition, whereby said electrical transmission elements will move relative to one another during such intermittent movement, and repeating the aforesaid steps with the new contact region in operative position; and
(e) temporarily relieving said bias concomitantly with each said intermittent movement.

11. A method as claimed in claim 10 wherein said step of biasing said electrical transmission elements against one another includes the step of applying a fluid pressure to a fluid pressure actuated mechanism linked to at least one of said electrical transmission elements, and said step of temporarily relieving said bias includes the step of temporarily reducing said fluid pressure.

12. A method as claimed in claim 10 wherein said step of temporarily relieving said bias includes the step of reducing said bias substantially to zero.

13. A method as claimed in claim 10 wherein said step of relieving said bias is performed so as to reduce said bias before each said intermittent movement, maintain said bias in a reduced condition during each said intermittent movement and increase said bias after each said intermittent movement.

14. A method of operating an electrical bonding machine comprising the steps of:
(a) providing a plurality of electrode holders each having an electrode releasably mounted thereon;
(b) positioning said electrode holders in sequence in an operative disposition on said machine; and
(c) engaging the electrode of each holder with successive workpieces while that holder is in operative disposition and performing a bonding operation on each such workpiece using the electrode mounted on such holder, said step of positioning said holders in sequence including the step of detaching each electrode holder from the machine after use in said bonding operations and replacing each such detached electrode holder with another one of said electrode holders, the method further comprising the steps of adjusting the position of the electrode mounted in each electrode holder relative to such holder while such holder is detached from the machine, reusing each said holder after said adjustment in said replacing step as a replacement for a previously used holder, and using each such replacement holder and the electrode mounted therein in further bonding operations without additional adjustment of the electrode relative to the holder or of the holder relative to the machine.

15. A method as claimed in claim 14 wherein said step of positioning said electrode holders on the fusing machine includes the steps of engaging each said electrode holder in a station of a retainer element defining a plurality of stations and intermittently moving said retainer element relative to the machine so as to bring a new holder-engaging station, and the holder engaged therewith, into operative disposition, and to move another holder-engaging station, and a holder engaged therewith out of operative disposition.

16. A method as claimed in claim 15 wherein said step of detaching each said electrode holder from the fusing machine includes the step of detaching each said electrode holder from a station of said retainer element while such station is out of operative disposition, and wherein said step of replacing each said removed electrode holder includes the step of engaging each said electrode holder in a station of one said retainer element while such station is out of operative disposition.

17. A method as claimed in claim 14 further comprising the step of replacing the electrode associated with each electrode holder while such electrode holder is detached from the machine but before said adjustment step.

18. A method as claimed in claim 14 wherein said step of adjusting the position of the electrode in each holder includes the step of engaging each electrode holder with a fixture remote from the machine and adjusting the electrode associated with such electrode holder so that the electrode is also engaged with said fixture.

19. A method as claimed in claim 14 wherein said step of positioning said electrode holders on the machine includes the step of engaging each electrode holder with a retainer element on the machine so that an abutment surface on each electrode holder confronts an abutment service on said retainer element.

20. A method as claimed in claim 19 wherein said step of engaging the electrode with successive workpieces includes the step of applying forces through said abutment surfaces, and said step of performing a bonding operation includes the step of transmitting electricity through said abutment surfaces from said retainer element to the electrode holder in operative disposition and through such electrode holder to the associated electrode.

21. A method as claimed in claim 20 wherein said step of engaging each said electrode holder with the retainer element includes the step of positioning an elongated shank on each said electrode holder within a bore in said retainer element.

22. A method as claimed in claim 21 wherein said step of engaging each said electrode holder with said retainer element includes the step of biasing each said shank transversely of the associated bore so as to force said shank against a wall of the bore.

23. A method as claimed in claim 14 wherein said detaching and replacing steps performed automatically.

24. An electrode changer for an electrical bonding machine comprising:
(a) a plurality of separate electrode holders, each said electrode holder including means for engaging an electrode and means for adjusting the position of the engaged electrode relative to the holder;
(b) a retainer element;
(c) means for mounting said retainer element on the machine;
(d) means for releasably securing at least one said holder to the retainer element so that one said holder is in an operative disposition on the machine; and (e) holder change means for replacing the electrode holder in operative disposition with another one of said electrode holders.

25. A electrode changer as claimed in claim 24 wherein said means for securing includes means for securing a plurality of said electrode holders to said retainer element, said holder change means including means for moving said retainer element relative to said machine so as to move one said electrode holder out of said operative disposition and move another said electrode holder into operative disposition.

26. An electrode changer as claimed in claim 25 wherein said means for mounting said retainer element on said machine includes means for mounting said retainer element on said machine so that said retainer element is rotatable about a predetermined axis and said means for moving said retainer element includes means for rotating said retainer element around said axis.

27. An electrode changer as claimed in claim 27 wherein said retainer element includes a plurality of stations and an abutment surface at each said station, the abutment surface at each said station being disposed at the same distance from said axis as the abutment surface at every other one of said stations, each said electrode holder having an abutment surface, said means for securing said electrode holders to said retainer element including means for engaging one said electrode holder with said retainer element at each said station so that the abutment surface on each said electrode holder confronts the abutment surface on said retainer element at the associated station.

28. An electrode changer as claimed in claim 24 wherein said holder change means includes mechanical means for detaching one said electrode holder from said retainer element after that one of said electrode holders has been in said operative disposition and replacing the detached one of said electrode holders with another one of said electrode holders.

29. An electrode changer as claimed in claim 24 further comprising fixture means for engaging one of said electrode holders while said one of said electrode holder is detached from said retainer element so as to control adjustment of the position of an electrode in such holder.

30. An electrical bonding machine comprising:
(a) an electrically conductive retainer element having a bore extending in forward and rearward directions, an opening at the forward end of the bore and a forwardly facing abutment surface;
(b) an electrically conductive electrode holder having an elongated shank defining opposite first and second axial directions, an abutment surface facing in said first axial direction and means for engaging an electrode so that said electrode projects from said electrode holder in said second axial direction and so that the position of said electrode in said axial directions with respect to said electrode holder is adjustable;
(c) means for releasably engaging said holder with said retainer element so that said shank is received in said bore, the electrode retained on said holder projects forwardly and said abutment surface of said holder faces rearwardly and confronts said abutment surface of said retainer element;
(d) means for biasing said retainer element in said forward direction so as to force the electrode engaged in the electrode holder into engagement with the workpiece whereby said bias will also force said abutment surfaces into engagement with one another; and
(e) means for transmitting electrical current to said retainer element so that such current is transmitted through said engaged abutment surfaces to the electrode holder and from the electrode holder to the electrode engaged therewith.

31. A machine as claimed in claim 30 wherein said means for releasably retaining said electrode holder includes means for biasing said electrode holder transverse to said forward and rearward directions so as to force said shank into engagement with the wall of said bore.

32. A machine as claimed in claim 30 wherein said electrode holder has a notch in said shank, said notch having a lip facing in said second axial direction along said shank, said means for releasably retaining said electrode holder including a catch and means for releasably retaining said catch on said retainer element so that said catch is engaged with said lip.

* * * * *

UNITED STATES PATENT AND TRADEMARK OFFICE
CERTIFICATE OF CORRECTION

PATENT NO. : 4,904,838

DATED : February 27, 1990

INVENTOR(S) : Charles F. Szantho, Allan Warner, and Edward D. Riordan

It is certified that error appears in the above-identified patent and that said Letters Patent is hereby corrected as shown below:

Column 8, line 1, "10" should read --100--.
Column 8, line 40, "12B" should read --128--.
Column 9, line 46, "16" should read --162--.
Column 10, line 22, "18" should read --180--.
Column 13, line 26, "5" should read --50--.
Column 19, line 21, "27" should read --26--.

Signed and Sealed this

Sixteenth Day of July, 1991

Attest:

HARRY F. MANBECK, JR.

*Attesting Officer*  Commissioner of Patents and Trademarks

REEXAMINATION CERTIFICATE (1982nd)
United States Patent [19]
Szantho et al.

[11] B1 4,904,838
[45] Certificate Issued  Apr. 20, 1993

[54] ELECTRODE CHANGERS AND METHODS OF OPERATION FOR ELECTRICAL BONDING APPARATUS

[75] Inventors: Charles F. Szantho, Roselle Park; Allan Warner, Clark; Edward D. Riordan, S. Somerville, all of N.J.

[73] Assignee: Joyal Products, Inc., Linden, N.J.

Reexamination Request:
 No. 90/002,777, Jul. 10, 1992

Reexamination Certificate for:
 Patent No.: 4,904,838
 Issued: Feb. 27, 1990
 Appl. No.: 164,122
 Filed: Mar. 4, 1988

Certificate of Correction issued Feb. 27, 1990.

Related U.S. Application Data

[63] Continuation-in-part of Ser. No. 908,566, Sep. 18, 1986, Pat. No. 4,766,282.

[51] Int. Cl.⁵ .............................................. B23K 11/30
[52] U.S. Cl. ............................. 219/86.8; 219/86.33; 219/86.7
[58] Field of Search ................. 219/86.25, 86.33, 86.7, 219/86.8

[56] References Cited
U.S. PATENT DOCUMENTS
3,313,909  4/1967  Matthews .......................... 219/86.8

FOREIGN PATENT DOCUMENTS
0201112  11/1986  European Pat. Off.

*Primary Examiner*—Clifford C. Shaw

[57] ABSTRACT

Electrical bonding apparatus such as a fusing machine is provided with plural separate electrode holders such that the position of an electrode relative to each holder can be adjusted. The position of each electrode relative to the holder is adjusted while the holder is detached from the machine, and while other holders and electrodes are in place on the machine. Thus, the machine can be provided with a new electrode preadjusted to the desired position by interchanging electrode holders. An electrode changer on the fusing machine may include a frame and a movable retaining element adapted to hold several electrodes at different stations. Electrical transmission elements such as brushes on the retaining element and frame may be biased against one another to provide an electrically conductive path, and this bias may be released upon movement of the retaining element relative to the frame so as to avoid wear of the electrical transmission elements. The holders may be releasably attached to the retaining element and may be detached and replaced to interchange the holders on the machine with other holders.

B1 4,904,838

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 14–32 is confirmed.

Claims 1 and 10 are determined to be patentable as amended.

Claims 2–9 and 11–13, dependent on an amended claim, are determined to be patentable.

New claims 33–45 are added and determined to be patentable.

1. An electrode changer for electrical bonding apparatus comprising:
    (a) a frame;
    (b) a retaining element movably mounted to the frame;
    (c) means for securing at least one electrode defining a plurality of contact regions to said retaining element;
    (d) means for arresting movement of said retaining element relative to said frame so as to hold one of said contact regions in an operative position and intermittently moving said retaining element relative to said frame to bring a new one of said contact regions into said operative position;
    (e) means for transmitting electrical current to said retaining element, said electrical transmitting means including an electrical transmission element on said frame and an electrical transmission element on said retaining element, *said electrical transmission elements being separately constructed from said means for arresting movement of said retaining element;*
    (f) means for biasing said electrical transmission elements into engagement with one another; and
    (g) means for temporarily relieving said bias concomitantly with intermittent movement of said retaining element.

10. A method of operating an electrical bonding machine having a frame, a retaining element, at least one electrode defining a plurality of contact regions on said retaining element [and] , *first* electrical transmission [elements] *element* on said frame *movable relative thereto* and *second electrical transmission element on* said retaining element, said method comprising the steps of:
    (a) maintaining said retaining element in fixed position relative to said frame so as to maintain one of said contact regions in operative disposition;
    (b) repetitively engaging the contact region in operative disposition with successive workpieces;
    (c) biasing said electrical transmission elements against one another so as to maintain the same in electrical contact with one another *by movement of said first electricaltransmission element relative to said frame*, and transmitting electrical current through said electrical transmission elements to the contact region in [a] *an* operative position so as to thereby perform a bonding operation on each workpiece,
    (d) intermittently moving said retaining element relative to said fixed elemenet so as to bring a new one of said contact regions into operative disposition, whereby said electrical transmission elements will move relative to one another during such intermittent movement, and repeating the aforesaid steps with the new contact region in operative position; and
    (e) temporarily relieving said bias concomitantly with each said intermittent movement.

*33. An electrode changer for electrical bonding apparatus comprising: a frame; a retaining element movably mounted to the frame about a shaft; means for securing at least one electrode defining a plurality of contact regions to said retaining element; means for arresting movement of said retaining element relative to said frame so as to hold one of said contact regions in an operative position and intermittently moving said retaining element relative to said frame to bring a new one of said contact regions into said operative position; means for transmitting electrical current to said retaining element, said electrical transmitting means including an electrical transmission element on said frame and an electrical transmission element on said retaining element; means for biasing said electrical transmission elements into engagement with one another, whereby current flow from said electrical transmission elements to said retaining element is predominantly through said shaft; and means for temporarily relieving said bias concomitantly with intermittent movement of said retaining element.*

*34. An electrode changer as claimed in claim 33, wherein said electrical transmission elements are separately constructed from said means for arresting movement of said retaining element.*

*35. An electrode changer for electrical bonding apparatus comprising: a frame; a retaining element rotationally mounted to the frame about a predetermined axis; means for securing at least one electrode defining a plurality of contact regions to said retaining element; means for arresting movement of said retaining element relative to said frame so as to hold one of said contact regions in an operative position; means for intermittently moving said retaining element relative to said frame to bring a new one of said contact regions into said operative position; means for transmitting electrical current to said retaining element, said electrical transmitting means including an electrical transmission element on said frame and an electrical transmission element on said retaining element; means for biasing said electrical transmission elements into engagement with one another; and means for temporarily relieving said bias concomitantly with intermittent movement of said retaining element, wherein said electrical transmission elements include a shaft on said retaining element at said predetermined axis and two brushes movably mounted to said frame on opposite sides of said axis, said means for biasing including means for biasing both of said brushes transversely of said axis toward said shaft with substantially equal force.*

*36. An electrode changer for electrical bonding apparatus comprising: a frame; a retaining element movably mounted to the frame; means for securing at least one* electrode defining a plurality of contact regions to said retaining element; means for arresting movement of said retaining element relative to said frame so as to hold one of said contact regions in an operative position and intermittently moving said retaining element relative to said frame to bring a new one of said contact regions into said operative position; means for transmitting electrical current to said retaining element, said electrical transmitting means including an electrical transmission element on said frame and an electrical transmission element on said retaining element, said electrical transmission element on said frame movable relative to said frame for biasing into engagement with said electrical transmission element on said retaining element; means for biasing said electrical transmission elements into engagement with one another by movement of said electrical transmissions element on said frame; and means for temporarily relieving said bias concomitantly with intermittent movement of said retaining element.

37. An electrode changer as claimed in claim 36, wherein said electrical transmission element on said frame is moveable in response to said means for biasing and said means for temporarily relieving said bias separate from the intermittent movement of said retaining element.

38. An electrode changer as claimed in claim 36, wherein said electrical transmission elements are separately constructed from said means for arresting movement of said retaining element.

39. An electrode changer as claimed in claim 36, wherein said retaining element is mounted about a shaft.

40. An electrode changer as claimed in claim 39, wherein current flow from said electrical transmission elements to said retaining element is predominantly through said shaft.

41. A method as claimed in claim 10, further comprising moving said first electrical transmission element on said frame in response to biasing and said temporarily relieving said bias separately from said intermittently moving said retaining element.

42. A method of operating an electrical bonding machine having a frame, a retaining element mounted about a shaft, at least one electrode defining a plurality of contact regions on said retaining element and electrical transmission elements on said frame and said retaining element, said method comprising the steps of: maintaining said retaining element in fixed position relative to said frame so as to maintain one of said contact regions in operative disposition; repetitively engaging the contact region in operative disposition with successive workpieces; biasing said electrical transmission elements against one another so as to maintain the same in electrical contact with one another and transmitting electrical current through said electrical transmission elements to the contact region in an operative position so as to thereby perform a bonding operation on each workpiece, whereby current flow from said electrical transmission elements to said retaining element is predominantly through said shaft; intermittently moving said retaining element relative to said fixed element so as to bring a new one of said contact regions into operative disposition, whereby said electrical transmission elements will move relative to one another during such intermittent movement, and repeating the aforesaid steps with the new contact region in operative position; and temporarily relieving said bias concomitantly with each said intermittent movement.

43. A method of operating an electrical bonding machine having a frame, a retaining element, at least one electrode defining a plurality of contact regions on said retaining element and electrical transmission elements on said frame and said retaining element, said method comprising the steps of: maintaining said retaining element in fixed position relative to said frame so as to maintain one of said contact regions in operative disposition; repetitively engaging the contact region in operative disposition with successive workpieces; biasing said electrical transmission elements against one another so as to maintain the same in electrical contact with one another and transmitting electrical current through said electrical transmission elements to the contact region in an operative position so as to thereby perform a bonding operation on each workpiece, said biasing of said electrical transmission elements being separately operative from said maintaining said retaining element in fixed position; intermittently moving said retaining element relative to said fixed element so as to bring a new one of said contact regions into operative disposition, whereby said electrical transmission elements will move relative to one another during such intermittent movement, and repeating the aforesaid steps with the new contact region in operative position; and temporarily relieving said bias concomitantly with each said intermittent movement.

44. An electrode changer as claimed in claim 1, wherein said retaining element is mounted to said frame about a shaft, and wherein said electrical transmission elements are arranged for biasing into engagement with a portion of said shaft.

45. An electrode changer as claimed in claim 1, wherein said means for arresting movement of said retaining element comprises a pin engaging a portion thereof.

* * * * *